United States Patent [19]
Barnes et al.

[11] Patent Number: 5,793,857
[45] Date of Patent: *Aug. 11, 1998

[54] METHOD OF USING DYNAMIC DATABASE TO IMPROVE TELEPHONE NUMBER PORTABILITY

[75] Inventors: Stephen Dean Barnes, Plano; James F. Bartoszewicz, Wiley, both of Tex.; Ronald Schwartz, Nepean, Canada; Krishnamurthy Giridharagopal, Plano, Tex.

[73] Assignee: Northern Telecom Limited, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 534,290

[22] Filed: Sep. 27, 1995

[51] Int. Cl.⁶ .................................................. H04M 3/00
[52] U.S. Cl. ...................... 379/207; 379/211; 379/220; 379/229
[58] Field of Search ................................ 379/201, 207, 379/219, 220, 221, 229, 127, 211, 213

[56] References Cited

U.S. PATENT DOCUMENTS

| | | | |
|---|---|---|---|
| 4,162,377 | 7/1979 | Mearns | 379/127 |
| 4,191,860 | 3/1980 | Weber | 379/211 |
| 4,565,903 | 1/1986 | Riley | 379/201 |
| 4,754,479 | 6/1988 | Bicknell et al. | 379/211 |
| 4,866,763 | 9/1989 | Cooper et al. | 379/201 |
| 5,237,604 | 8/1993 | Ryan | 379/220 |
| 5,259,026 | 11/1993 | Johnson | 379/213 |
| 5,270,701 | 12/1993 | Ito et al. | 379/211 |
| 5,311,572 | 5/1994 | Friedes et al. | 379/211 |
| 5,329,578 | 7/1994 | Brennan et al. | 379/211 |
| 5,333,184 | 7/1994 | Doherty et al. | 379/229 |
| 5,333,185 | 7/1994 | Burke et al. | 379/127 |
| 5,386,467 | 1/1995 | Ahmad | 379/207 |
| 5,473,681 | 12/1995 | Partridge, III | 379/201 |
| 5,475,749 | 12/1995 | Akinpelu et al. | 379/201 |
| 5,481,603 | 1/1996 | Gutierrez et al. | 379/221 |
| 5,509,058 | 4/1996 | Sestak et al. | 379/201 |
| 5,509,062 | 4/1996 | Carlsen | 379/201 |
| 5,515,427 | 5/1996 | Carlsen et al. | 379/201 |
| 5,550,910 | 8/1996 | DeJager | 379/201 |
| 5,550,912 | 8/1996 | Akinpelu et al. | 379/201 |
| 5,559,877 | 9/1996 | Ash et al. | 379/219 |
| 5,598,464 | 1/1997 | Hess et al. | 379/207 |
| 5,625,681 | 4/1997 | Butler, II | 379/207 |
| 5,689,555 | 11/1997 | Sonnenberg | 379/220 |
| 5,696,816 | 12/1997 | Sonnenberg | 379/220 |

*Primary Examiner*—Ahmad F. Matar
*Assistant Examiner*—Scott Wolinsky
*Attorney, Agent, or Firm*—Thomas R. Vigil

[57] ABSTRACT

A system for providing telephone number portability within a structurally distributed telephone system by providing an address capture database (ACDB) for local exchange carriers (LECs) wherein a new number (NN) is stored in the ACDB if the NN is a physical address served by a LEC and the NN corresponds to a dialled directory number (DN) ported into or located within the LEC.

13 Claims, 1 Drawing Sheet

METHOD OF USING DYNAMIC DATABASE TO IMPROVE TELEPHONE NUMBER PORTABILITY

CROSS-REFERENCE TO RELATED APPLICATION

The present application is related to commonly assigned, concurrently filed application by Martinez et al. titled ENHANCED EFFICIENT TELEPHONE NUMBER PORTABILITY, Ser. No. 08/534,668, which is incorporated herein by reference.

BACKGROUND OF THE INVENTION

1. Field of the Invention

The present invention relates to telephony systems in general, and to telephone number portability, also known as local number portability (LNP), within such systems. More particularly still, it relates to an improvement whereby the recurrent cost and delay in executing number portability is reduced. An address capture database (ACDB) is provided, for example, at the access tandem (AT) switch to avoid repeating the full LNP procedure after first occurrence. The ACDB captured addresses can be aged and discarded to make room for new entries in the order of their use frequency.

2. Related Art

Today, most services are resident in the software in each central office switch. While this has allowed providers to deliver a vast array of features, it also means that providers must depend on vendors to develop new features and then must often coordinate the development of these features among the several switch vendors that they buy equipment from. When the features are available, they must then be loaded into each individual switch in the network, a complex task for networks that may contain hundreds of central offices.

As competition intensifies between providers of telephony services, providers are looking for three key competitive advantages:

They want to be able to rapidly develop customized features to differentiate their offering in the marketplace.

They want to be able to quickly deploy new features ubiquitously throughout their serving areas as cost-effectively as possible.

They want to put certain processing-intensive or network-based (as opposed to switch-based) services such as local number portability and PCS (Personal Communications Services) into centralized databases that all network switches can access.

Advanced Intelligent Networking (AIN—also known, especially outside of North America, as Intelligent Networking (IN)) is currently being deployed across the United States and Canada to provide these key advantages.

AIN places the intelligence to deliver key features in a centralized network database—called a service control point (SCP) instead of in each individual switch. "Triggers" in the software of individual service switching points (SSPs— central office switches with AIN software) momentarily interrupt call processing and generate queries of the SCP for instructions on how to process features for individual calls.

AIN also provides a standardized service creation environment (SCE) that lets any vendor, including the service provider, develop software for the SCP. Providers can then quickly create (or have other specialized companies create) custom features and load them into the SCP, where they can be immediately accessed and used by any SSP in the network.

New market entrants can either install their own AIN infrastructure, or purchase AIN capabilities from established providers.

Initial AIN features include:

For the Residential Subscriber

Sophisticated Call Screening and Management Features that allow users to determine who can reach them and when—a caller could, for instance, decide to take only long distance calls, or calls from immediate family, during dinner time, or that 900 calls could only be made during the times of the day when the parents are typically at home.

Enhanced Voice Mail and Messaging Services over the public network.

Personal Communications Services (PCS) that allow users to receive fully-featured calls any place in the network, wherever they happen to be.

For the Business Subscriber

Private Virtual Networks that give users cost-effective customized networks using any combination of public and private facilities.

Virtual Offices that allow users to port business features to a home or cellular telephone as they move about the network.

Area Number Calling that allows a business to advertise one number throughout an area, but automatically receive calls at the branch nearest to the caller.

Network and Nodal Automatic Call Distribution available from any central office.

As may be seen from the above discussion, one of the most desirable network capabilities generally is telephone number portability; but at least local number portability (LNP), that is, number portability within a "local access and transport area" (LATA). Other desirable features involve number portability as applied to personal communications services (PCS); for example, as for cellular telephones.

LNP can encompass service portability, service provider portability, and location portability; the latter two being current goals and imply decoupling the originally dialled directory number (DN) for its "donor" switch.

It has generally been assumed that local number portability would best be provisioned through the use of some type of external database, perhaps similar to that employed for 800 service.

Regarding the point during the call at which the database is queried, it has been suggested that three basic alternatives are present. One alternative is to route the call to the terminating switch to which the NPA/NXX of the dialled number was assigned, the Terminating Access Provider (TAP)—usually the incumbent provider, performing the database query at that point, and based upon the response received back, routing the call to the actual terminating switch of the (new) Terminating Local Service Providers (TLSP). This would require that all calls to ported numbers be routed through the incumbent provider's (TAPs) facilities.

A second alternative is to have the Originating Service Provider (OSP) always perform the database query at the switch from which the call is originated, and based upon the information received back in the response, route the call direct, if possible, to the TLSP.

A third alternative is the so-called "N - 1 Alternative", which states that the point at which the database query is launched (and who is responsible for launching it) is determined by the number of carriers involved in the call. If the call is local (or intra-LATA) and involves only two carriers, it is the originating carrier (i.e., OSP) that is responsible for performing the database query. If, however, the call is inter-LATA, involving an Interexchange Carrier (IC), then the intermediate carrier (i.e., IC) must perform the query to obtain final routing instructions. This assumes that the OSP can determine from the dialled NPA/NXX whether the call is local, intra-LATA or inter-LATA. This allows LNP to begin in bounded areas, and limits the need for OSPs to perform database queries on every call.

There has been discussion regarding the composition and format of the database response message which contains the routing information. It has been suggested that a new signalling parameter, Service Providers Identification (SPID) be established to merely identify which TLSP now serves the dialled number, so that the call can be routed to that provider's nearest point-of-presence (POP). Alternatively, it has been suggested that to gain peak network efficiency, the actual terminating switch needs to be identified.

One solution proposes that the bond between customer telephone numbers and network termination addresses be completely broken and interspersed. Under their suggestion, a number dialled to reach a ported number customer (the customer number address—CNA) would first be sent to a database for replacement with a network node address (the NNA), which would be used to route the call to the correct terminating switch. Since the NNA is in the same format at the CNA (10-digit) and its first six digits uniquely identify the terminating switch (as is the case today) NANP-based routing remains unchanged, yet customers can retain their numbers whenever they move or change providers—the CNA is simply mapped to a new NNA in the database. Since both sets of numbers use the same format, they can be interspersed, i.e., a CNA for one customer can be a NNA for another, and vice versa. It has suggested that the database populate the CNA in the Generic Address Parameter (GAP), and the NNA in the Called Party (CdPN) parameter in its response message. It was also proposed to use a new Originating Line Info (OLI) parameter value to indicate whether a database dip has already been performed in a previous node, to prevent mix-ups of CNAs with NNAs in networks where database queries may be launched at multiple points.

Another solution proposes that rather than substituting NNAs for CNAs, the database merely populates one of the assigned six-digit NPA/NXXs of the actual terminating switch in the CdPN parameter, and moves the actual dialled number to the GAP. Since all network nodes route on the first six digits of the CdPN anyway, the call will progress to the actual terminating switch, which would look at the GAP address, where the dialled number is now located, rather than the CdPN, to determine the actual called line. Although no new signalling parameters are identified with this proposal, switching software modifications, to allow a change in their treatment, are probably required.

Of significant concern with some of the portability solutions identified thus far is the need to perform database queries on all or most originating calls. The additional load on the SS7 signalling network may be such that database deployment options may be severely limited, and/or service degradations such as post dial delay, loss of transmission quality or call blocking may be experienced. One suggestion has been to limit the number of queries needed by nationally "registering" those NPA/NXXs for which numbers have become portable. This would allow carriers to launch database queries only when those prefixes are dialled. Although feasible in the near-term, many feel that once number portability begins to expand, the amount of work required in each switch to trigger on each newly-portable NPA/NXX combination will become overly burdensome. Furthermore, this methodology necessitates a waiting period to ensure that all carriers have sufficient time to implement the necessary translations in each end office for each newly-portable prefix.

Absent some methodology to limit the number of queries launched to the portability database(s), the load on the SS7 signalling network may be significant. Although the existing links between the end offices and signalling hub (STP) were sufficient to handle the additional traffic, the number of new links and databases (SCPs) beyond the hub would be substantial. Therefore, if portability was widely offered, a provider's network would only be able to handle the data queries that were generated locally, not those coming in from other areas. The significance of this finding was that calls to ported numbers that originate from outside the ported number area may need to access databases separate from those handling traffic that originates within the area. This implies that unlike the LIDB (calling card database) model, multiple sets of databases, each containing data on the same numbers, may need to be deployed in different areas of the country and state.

SUMMARY OF THE INVENTION

The present invention provides an improved method of providing telephone number portability within a structurally distributed telephone system, and the like, comprising the steps of:

(a) accessing a remote database to retrieve a new (physical) number (NN), if any, for a dialled number (DN);

(b) storing said NN in a local database; and (c) checking said local database for a match every time said DN is dialled and establishing a connection with said NN upon finding said match without access to said remote database.

According to the present invention, an improved system for providing telephone number portability within a structurally distributed telephone system, and the like, comprises: a dynamic database for storing new routing information corresponding to a ported telephone number; switching means for accessing said dynamic database every time said ported telephone number is processed by said switching means; and means for replacing least used new routing information by routing information corresponding to a newly processed ported number.

BRIEF DESCRIPTION OF THE DRAWINGS

The preferred embodiments of the present invention will now be described in detail in conjunction with the drawings, in which.

DETAILED DESCRIPTION OF THE PREFERRED EMBODIMENTS

Figure 1:
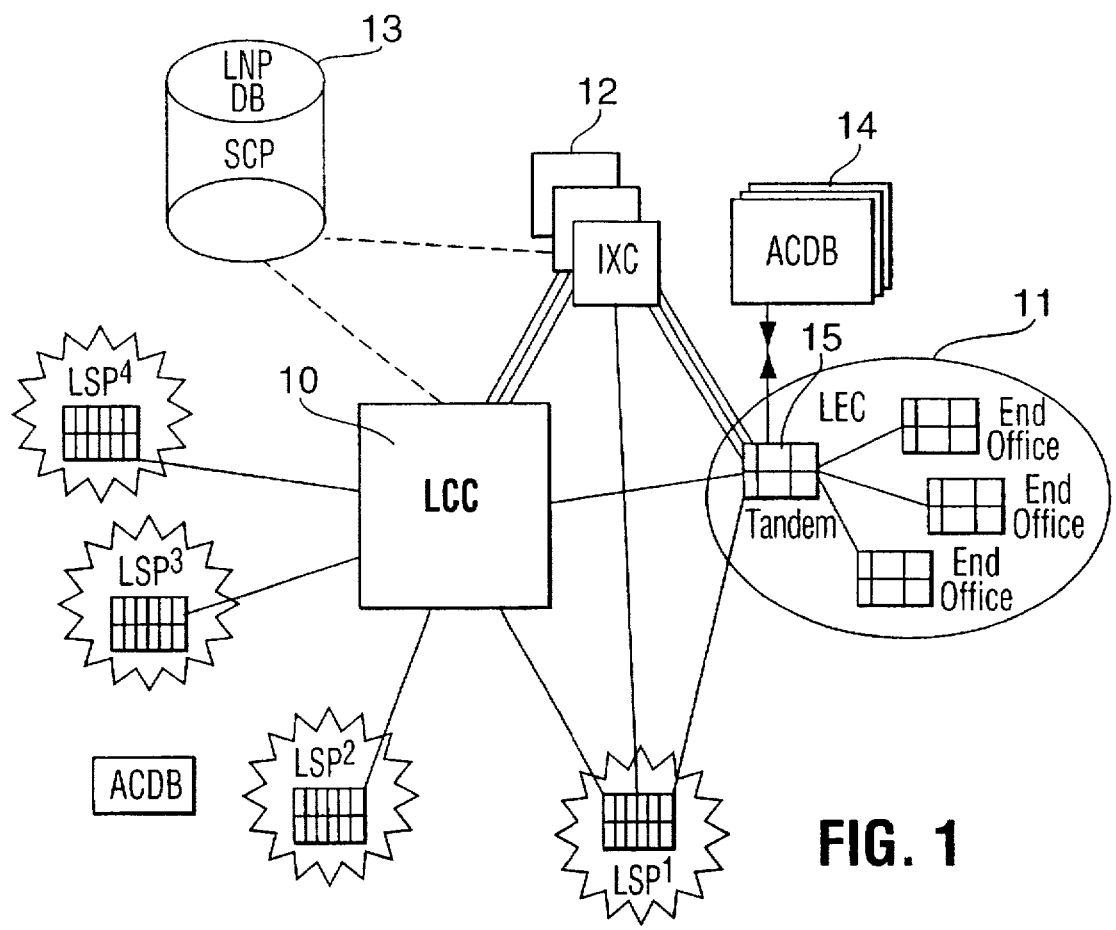
FIG. 1 is an illustration of the telephone system environment within which address capture databases (ACDB) are utilized according to the present invention.

Referring now to FIG. 1 of the drawings, the system environment within which the method of the present invention operates will be described.

Local Carriers' Carrier (LCC) 10, would offer services to other carriers in a local telephone serving area. This area, covered by a local exchange carrier (LEC) 11 LEC and possibly several independent operating companies (IOCs), is likely to host more than one competitive local service providers (LSP1 to LSP4), which may be competitive access providers (CAPs), cable companies, cellular carriers, personal communication service (PCS) operators, and others. There may also be several interexchange carriers (IXC) 12 serving end users in this area. A service control point (SCP) 13, which is a node in a CCS7 signalling network supports application databases, such as LNP information, and is normally separated from most LSPs and LECs.

As a traffic aggregator, the LCC 10 has trunks into each of the participating LSPs and IXC 12, as well as one trunk group into the LEC 11. It essentially serves as a multi-carrier interconnection provider to the LSPs and IXCs, with additional service offerings based on the LCC switch capability and customers needs.

The LCC 10 provides the following services to its carrier customers:

Tandeming traffic among LSPs, including local number portability service to LSPs and their customers that ported numbers between LSPs.

Providing LEC interconnection to LSPs. With a single trunk route to the LEC, the LCC aggregates and routes intraLATA traffic between the LSPs and the LEC.

Operating local number portability functions for customers ported between the LEC and LSPs, provided that local number portability protocols are established.

Providing LSPs with equal access connectivity to IXCs. The LCC aggregates and routes incoming and outgoing interLATA traffic of the LSPs to and from IXCs.

Providing E911 (Emergency) connectivity to the LSPs.

Providing operator services and other enhanced services to the LSPs.

LNP is, in effect, the decoupling of the dialable subscriber number from the network address that is indicated by that number. Today, these two uses of the dialled number significantly restrict the ability of the network to provide some services to the subscriber. One such service is geographic relocation of the number. The most important one is the ability to distinguish between competing service providers in the emerging competitive local telephone market. To implement LNP, a database is most likely to be used to map the dialled number into a future network address. The present invention lowers the costs associated with implementing these databases in the public switched network by reducing LD query costs and delay from origination to connection of a call.

By providing an address capture database (ACDB) 14 at the access tandem (AT) switch 15 of the LEC 11, or at an LSP such as LSP 3, the dynamic, self-learning captures data from previous call queries, that had to access the SCP 13, for reuse on subsequent calls. Thus call setup times are shortened on subsequent calls and the aggregate costs of making queries to the LNP database at the SCP 13 are lowered. It also lowers the maintenance and administrative costs associated with implementing a public (shared) database.

Preferably, the ACDB would be similar to the calling card databases used today, where entries are aged and dropped if they are not used regularly. The actual format of the address as stored may take several forms, including, a 10 digit North American Numbering Plan (NANP) number, a terminating switch ID and trunk group/route ID/Port #, or other routing information. The data does not have to take the same form in the capture database as is received from whatever source (be it an LNP database or another switch). Thus any manipulation can take place once (for the first call) and the result stored for reuse in the ACDB. Further, the captured data does not have to exist on the switch itself, but can be stored in an adjunct processor, or in another node in the network, provided there is a high-speed access between the switch and the data location. The ACDB is different from on-switch data tables in that it is updated by the process of delivering calls, and not from some manual or automatic service order system. Various scenarios for the acquisition of the routing NP data by the ACDB are discussed below.

Each switch requires access to the latest address in the master LNP database at the SCP 13 (a generic requirement for LNP capable switches). By of example, this master database could be maintained by a neutral third party charging for access, probably on a per query basis.

Once LNP is implemented in a designated portability area (defined by the switches that understand LNP and their NPA-NXX office codes), no call into this area would be failed due to a vacant DN (dialled number) condition until after the dialled DN has been checked against the master database to see if the customer has moved.

Four procedures may be used to identify if a telephone subscriber has moved. They are:

(a) The procedure disclosed in the cross-referenced, concurrently filed application.

(b) Regular Synchronization checks to verify the integrity of local data against the master database.

(c) Verification "Pings" against the known location of the subscriber. This can be done in several ways, including, but not limited to, the use of existing CLASS feature messaging intended for DN validation.

(d) Update information based on queries made by other switches in the operator's network, i.e. data sharing. (The network here is a group of interconnected switches owned by one entity.)

Figure 2:
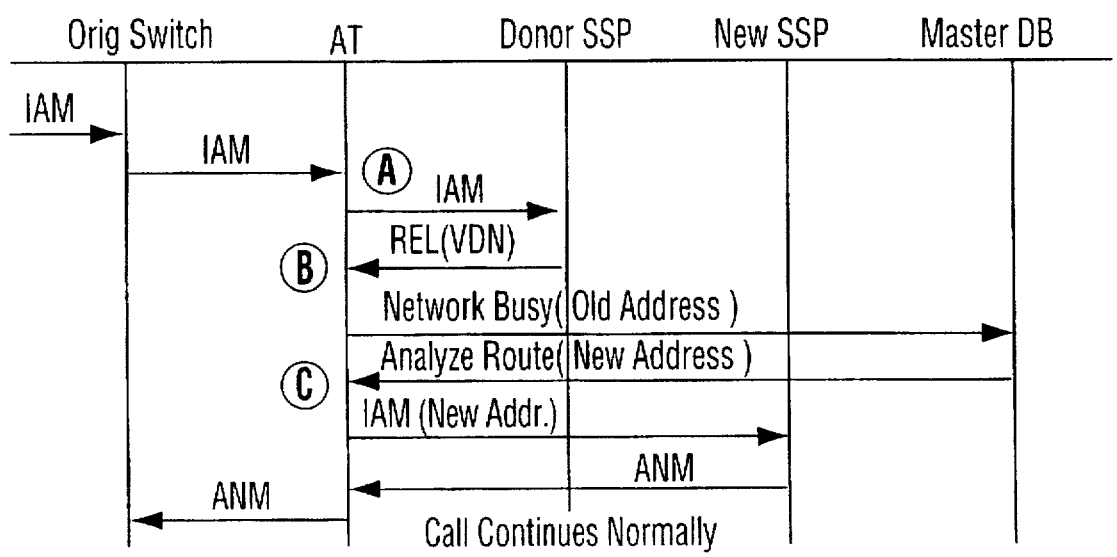
FIG. 2 illustrates call flow procedures implementing the method of the present invention within the system shown in FIG. 1.

The implementation of the present ACDB will be described with reference to FIG. 2 in conjunction with the first procedure (a) of the cross-referenced application.

In this example, the access tandem (AT) 15 is the switch performing the task. The steps it takes are as follows:

1. Receive the incoming address message (IAM), then compare the dialled digits with the ACDB 14 for a match ((A) in FIG. 2). This check can be filtered with a 3 or 6 digit flag in the translation tables to save work. If there is no value, i.e. no match, route on the original dialled digits to the donor switch. If there is a match, jump to point (B) (in FIG. 2) and route on the contents of the ACDB to new switch.

2. Old SSP switch checks line and terminates call normally if subscriber is present. Otherwise it returns an SS7 Release message with a cause value of "Vacant DN".

3. When the AT sees the SS7 Release (VacantDN) message (B), the call is routed to a query mechanism that initiates a query to the LNP master database with one of several messages. The AIN 0.1 NetworkBusy message is shown here, others are possible.

4. The database returns the current address in an AIN 0.1 AnalyzeRoute message. Again, this is only one of several possibilities.

5. The AT routes the call using the returned information (c), and saves the new routing information in the Address Capture Database. This is best done by sending the required information to a lower priority software task on the switch and allowing it to format the data correctly as processor capacity allows.

One alternative implementation to steps 3 & 4 is to have the switch broadcast a locator request to other switches in the area that may have received the ported subscriber. Only one will provide a positive acknowledgement, and the call is routed to that switch.

Another alternative implementation is for the donor switch to provide forwarding information to the tandem as additional information in the SS7 Release message (this makes use of the Release-To-Pivot functionality that has been defined by Bellcore). In this case, the provided information is processed, stored, and the call is routed to the new recipient switch.

An additional feature that can be added to the addressing concept is to provide a switch the ability to broadcast the change of a line's actual address to other switches or databases in the operator's network. This allows other switches to capture the data in an optimal time frame. This requires non-call associated signalling and some new messaging, along with the required switch software. A variety of known mechanisms can be used to improve the efficiency of this process, and to be sure that various copies of the data are kept in synchronization.

If the Look-Ahead algorithm (or any other Release message based algorithm) is not used as the normal LNP mechanism, then one of the other mechanisms will have to be used to implement the address capture database update process. As mentioned above, these include regular synchronization, validation "pings", and subscription to the update notifications from the master LNP database.

This same process of address or routing information caching can be applied to AIN, application is some contexts. Many services can be developed where the redirection information is relatively static with respect to a particular switching node in the network. These kinds of services are amenable to address caching in the same manner as has been described here for LNP addressing.

What is claimed is:

1. A method of providing telephone number portability within a structurally distributed telephone system having a plurality of local exchange carriers (LECs), comprising the steps of:

(a) providing an address capture database (ACDB) for at least one of said LECs;

(b) storing a new number (NN) in said ACDB if:
      (I) said NN is a physical address served by said at least one of said LECs; and
      (ii) said NN is a new physical address for a dialed directory number (DN) ported into or located within said at least one of said LECs;

(c) storing a correspondence between said NN and said DN in said ACDB, in response to a Signaling System 7 (SS7) Release message indicating that said DN is vacant;

(d) checking said ACDB for a match between said DN and said NN every time said DN is dialed; and (e) establishing a connection with said NN upon finding said match.

2. The method as defined in claim 1, wherein step (b) is performed only in response to a telephone call having been delivered to said NN.

3. The method as defined in claim 1, wherein said at least one of said LECs serves at least one of: a competitive access provider (CAP); a cable company; a cellular carrier and a personal communication service (PCS) operator.

4. The method as defined in claim 3, wherein said ACDB is provided for access by at least one of: a CAP; a cable company; a cellular carrier; and PCS operator.

5. The method as defined in claim 3, wherein said ACDB is provided for access by a tandem switching office serving said least one of said LECs.

6. The method as defined in claim 5, wherein step (b) is performed only in response to a telephone call having been delivered to said NN.

7. The method as defined in claim 5, wherein step (c) further comprises the step of said tandem switching office accessing a remote database other than said ACDB.

8. The method as defined in claim 7, wherein step (b) is performed only in response to a telephone call having been delivered to said NN.

9. The method as defined in claim 5, wherein step (c) further comprises the step of broadcasting said correspondence to switching offices within said structurally distributed telephone system.

10. The method as defined in claim 9, wherein the step of broadcasting is performed by a (donor) switch from which said DN was ported.

11. The method as defined in claim 5, wherein said SS7 Release message is processed by said tandem switching office.

12. The method as defined in claim 11, wherein said SS7 Release message includes routing information for forwarding calls to said NN.

13. The method as defined in claim 11, wherein step (b) is performed only in response to a telephone call having been delivered to said NN.

* * * * *